United States Patent
Nakagawa et al.

(10) Patent No.: US 6,762,998 B1
(45) Date of Patent: Jul. 13, 2004

(54) ACCESS NETWORK SYSTEM

(75) Inventors: Shuichi Nakagawa, Kanagawa (JP); Hiroyuki Asano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/476,447

(22) Filed: Dec. 30, 1999

(30) Foreign Application Priority Data

Jun. 18, 1999 (JP) ............................................ 11-172740

(51) Int. Cl.[7] .............................................. G01R 31/08
(52) U.S. Cl. ..................... 370/241; 370/244; 370/250; 379/1.01; 379/27.01
(58) Field of Search ................................ 370/241, 244, 370/248, 249, 250, 351, 352, 357, 359, 400, 401, 419, 420, 463, 524; 379/1.01, 9, 9.06, 12, 22, 22.01, 26.01, 27.01

(56) References Cited

U.S. PATENT DOCUMENTS

| | | | | |
|---|---|---|---|---|
| 5,442,621 A | * | 8/1995 | Ise et al. .................... | 370/251 |
| 5,724,411 A | * | 3/1998 | Eisdorfer et al. ......... | 379/93.23 |
| 5,781,623 A | * | 7/1998 | Khakzar ..................... | 379/230 |
| 6,278,707 B1 | * | 8/2001 | MacMillan et al. ......... | 370/352 |

FOREIGN PATENT DOCUMENTS

| EP | 0792079 | * | 8/1997 | ........... H04Q/11/04 |
|---|---|---|---|---|

OTHER PUBLICATIONS

ETS 300 347–1, pp. 138–152, Sep. 1994.*

* cited by examiner

Primary Examiner—Frank Duong
(74) Attorney, Agent, or Firm—Katten Muchin Zavis Rosenman

(57) ABSTRACT

In an access network system for performing a maintenance management of an access line, a processor stores an allocation status of a bearer channel to be managed, and a system manager determines an availability status of the access line based on the allocation status. Also, the processor determines the availability status based on the allocation status and loop open/close information of a PSTN/ISDN user line. Furthermore, the system manager 25 activates a test portion based on the availability status.

8 Claims, 14 Drawing Sheets

FIG.1
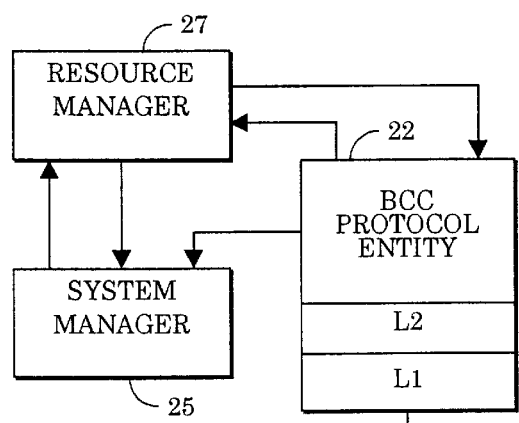
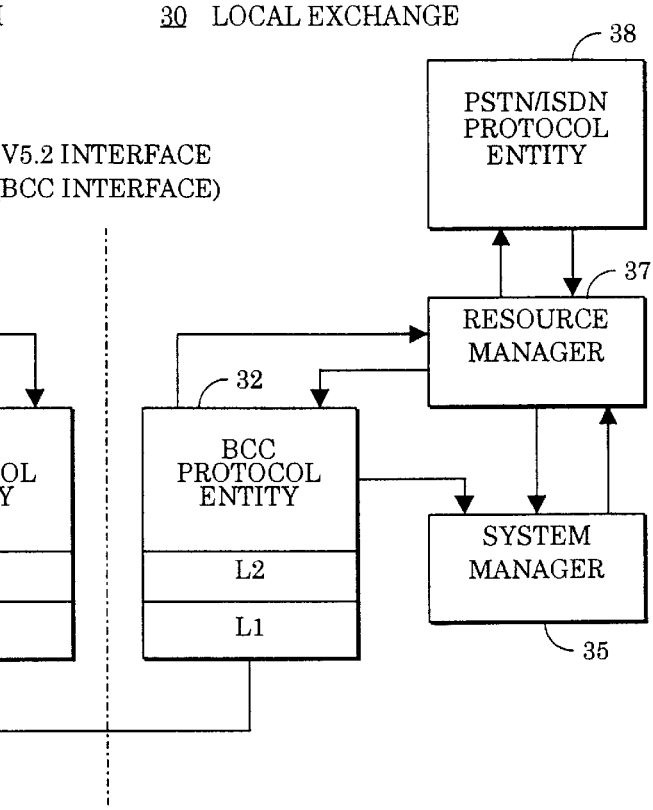

|   | BCC PROTOCOL | LOOP | STATUS |
|---|---|---|---|
| ① | DE-ALLOCATION | OPEN | IDLE |
| ② | ALLOCATION | CLOSE | BUSY |
| ③ | DE-ALLOCATION | CLOSE | LOCKOUT |
| ④ | ALLOCATION | OPEN | BUSY(RINGING) |

FIG.8

| PSTN V5.2 SUBSCRIBER (USER) STATUS | ALLOCATION STATUS | LOOP STATUS | STATUS OUTPUT | THE RESULT OF SUBSCRIBER LINE TEST |
|---|---|---|---|---|
| (1) ON-HOOK | NON | OPEN | IDLE | ON-HOOK (LINE CONDITION IS NORMAL) |
| (2) DIALING/CALLING | ALLOCATED | CLOSE | BUSY (CALLING) | REFUSE (NON-TESTABLE) |
| (3) CONVERSATION | ALLOCATED | CLOSE | BUSY | REFUSE |
| (4) CALLED SUBSCRIBER ON-HOOK AND WITHIN TIME OUT | ALLOCATED | CLOSE | BUSY | REFUSE |
| (5) CALLED SUBSCRIBER ON-HOOK AND TIME OUT | NON | CLOSE | LOCKOUT | OFF-HOOK |
| (6) ENCOUNTERING CALLED SUBSCRIBER BUSY STATE (WITHIN TIME OUT) | ALLOCATED | CLOSE | BUSY | REFUSE |
| (7) REMOTE CALLING SUBSCRIBER ON-HOOK IN CONVERSATION AND WITHIN TIME OUT | ALLOCATED | CLOSE | BUSY | REFUSE |
| (8) REMOTE CALLING SUBSCRIBER ON-HOOK IN CONVERSATION AND TIME OUT | NON | CLOSE | LOCKOUT | OFF-HOOK |
| (9) ERROR DIALED NUMBER AND WITHIN TIME OUT | ALLOCATED | CLOSE | BUSY | REFUSE |
| (10) ERROR DIALED NUMBER AND TIME OUT | NON | CLOSE | LOCKOUT | OFF-HOOK |
| (11) NO DIAL AND WITHIN TIME OUT | ALLOCATED | CLOSE | BUSY | REFUSE |
| (12) NO DIAL AND TIME OUT | NON | CLOSE | LOCKOUT | OFF-HOOK |
| (13) NO ANSWER AND TIME OUT | NON | CLOSE | LOCKOUT | OFF-HOOK |
| (14) SHORTING WIRE AND WITHIN TIME OUT | ALLOCATED | CLOSE | BUSY | REFUSE |
| (15) SHORTING WIRE AND TIME OUT | NON | CLOSE | LOCKOUT | SHORTING WIRE |
| (16) RINGING | ALLOCATED | OPEN | BUSY | REFUSE |

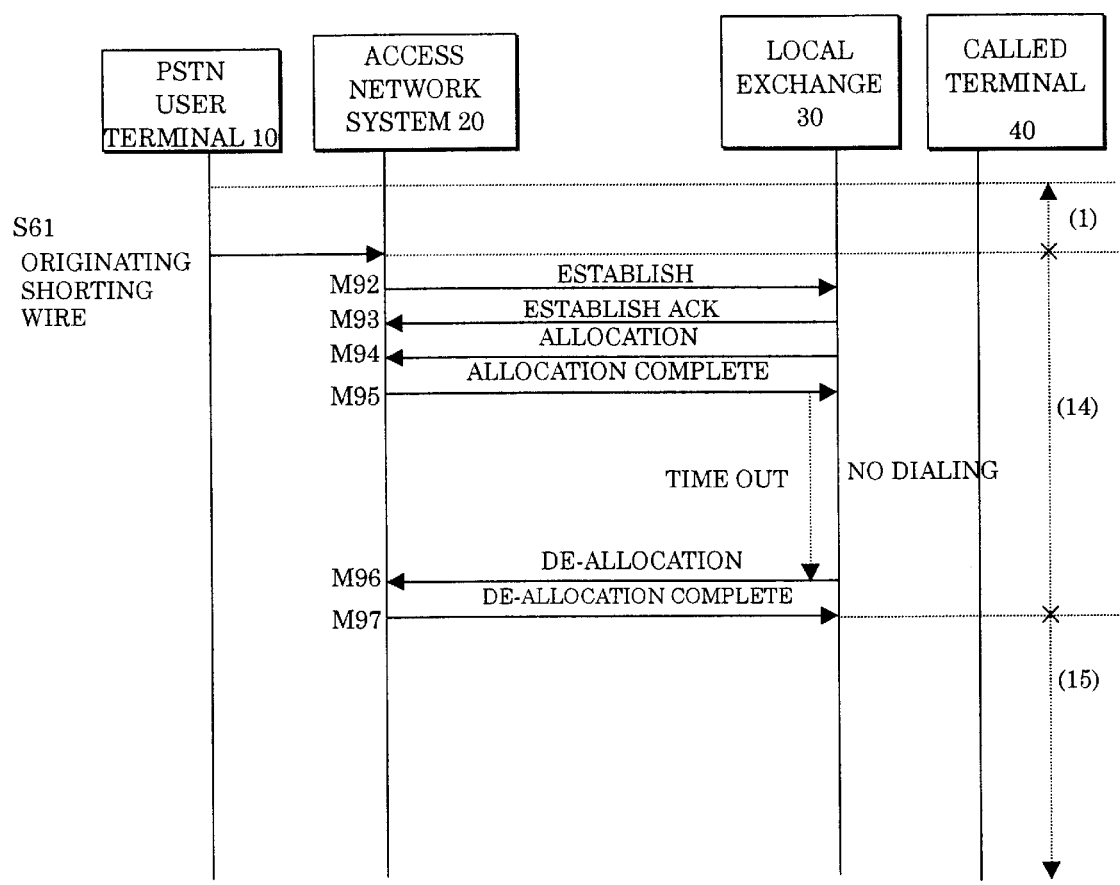

ACCESS NETWORK SYSTEM

BACKGROUND OF THE INVENTION

1. Field of the Invention

The present invention relates to an access network system, and in particular to an access network system (subscriber line transmission system) having a test function for performing a maintenance management of an access line (subscriber line).

In recent years, data communication and the like using an access line have been generally utilized. Performing a maintenance management of such an access line during communication without any disconnection is important for realizing a high quality service in the communication.

2. Description of the Related Art

A conventional PSTN (Public Switched Telephone Network) access network system has used only on/off-hook (loop open/close) information of a user or subscriber terminal (telephone) as information for grasping a line or circuit availability status of a PSTN user.

Since an access line assumes a loop close status also in case of short-circuit for some fault, it has been impossible to determine whether the loop close status is due to the fault or a mere off-hook.

When testing the access line which is the off-hook (loop close) state, it has been required that a maintenance person regards that the line is busy and can not be tested, and retries a test when the access line assumes the on-hook (loop open) state.

When determining the line in the off-hook state to be abnormal, the maintenance person has been required to compulsorily test the access line and to determine whether the abnormality is due to a mere off-hook state or the above-mentioned short-circuit.

On the other hand, since a conventional ISDN (Integrated Services Digital Network) access network system has no factor for grasping a physical line status by the method, it has no means for determining whether the user actually uses the line or the fault occurs in the line when the line is busy.

Therefore, the maintenance person has suppressed transmitting and receiving calls by manually changing the mode of the access line to a maintenance mode to test the access line.

As mentioned above, in the conventional access network systems, the PSTN access line has been compulsorily tested by the maintenance person's determination, while the ISDN access line has been tested with being compulsorily switched over to the maintenance mode. Accordingly, even when the line is used without problems, a damage can occur such that the line is disconnected during conversation or data communication.

SUMMARY OF THE INVENTION

It is accordingly an object of the present invention to grasp an availability status of an access line to be tested in an access network system which performs a maintenance management of the access line.

In order to achieve the above-mentioned object, an access network system, according to claim 1, of the present invention comprises; a processor for performing a connection and a release process of a bearer channel and storing an allocation status of the bearer channel to be managed, and a system manager for determining an availability status of an access line based on the allocation status.

FIG. 1 shows an access network system 20 and a local exchange (switchboard) 30 operated by e.g. the V5.2 interface. The access network system 20 and the local exchange 30 are respectively composed of a physical layer in the layer 1, a data link layer in the layer 2, and e.g. BCC (Bearer Channel Connection) protocol entities (processors) 22, 32, system managers 25, 35, and resource managers 27, 37 in the layer 3. The local exchange 30 further has a PSTN/ISDN protocol entity 38 in the upper layer.

The BCC protocol entities 22 and 32 of the access network system 20 and the local exchange 30 mutually transmit/receive the messages of the BCC protocol prescribed at a V5.2 interface point according to a predetermined procedure when a user calls or is called, thereby connecting and releasing the bearer channel.

The processor 22 in the access network system 20 of the present invention stores and manages the allocation status of the bearer channel. The system manager 25 determines whether the availability status of the access line is "busy" when the allocation status of the bearer channel is "being allocated". Thus, it becomes possible to grasp the availability status of the access line.

Also, in the present invention according to claim 2, the processor 22 may determine the allocation status based on an ALLOCATION COMPLETE message and a DE-ALLOCATION COMPLETE message for the bearer channel.

Namely, the processor 22 can determine that the bearer channel is allocated by the "ALLOCATION COMPLETE message" of the bearer channel or that the bearer channel is released (not allocated) by the "DE-ALLOCATION COMPLETE message", which are stored as the allocation status.

Thus, it becomes possible to easily grasp the allocation status of the bearer channel.

Also, in the present invention according to claim 3, the access line may form a PSTN.

Thus, the availability status of the PSTN access line can be grasped.

Also, in the present invention according to claim 4, the access line may form an ISDN-BRA (Basic Rate Access), i.e. N-ISDN.

Thus, the availability status of the ISDN-BRA access line can be grasped.

FIG. 2 shows a V5.2 protocol sequence in which a PSTN user terminal 10 calls a terminal 40 through the access network system 20 and the local exchange 30 connected by e.g. the V5.2 interface.

Messages M1–M9 transferred between the access network system 20 and the local exchange 30 are protocol messages of the V5.2 interface prescribed by ETS300 324-1/300 347-1 of the ETSI (European Telecommunication Standard Institute) when the PSTN user calls.

Receiving an off-hook signal indicating a call originated from the user terminal 10 (at step S1), the access network system 20 exchanges an "ESTABLISH message M1" and an "ESTABLISH ACK message M2" with the local exchange 30.

After this exchange, the local exchange 30 transmits an "ALLOCATION message M3" instructing the allocation of the bearer channel to an address (L3 address) of the layer 3, while the access network system 20 returns an "ALLOCATION COMPLETE message M4" instructing that an allocation process is normally executed.

The local exchange 30 sends a dial tone (at step S2), so that the user terminal 10 can perform dialing (SIGNAL of 1st digit-last digit) (at step S3).

After ringing, the local exchange 30 returns a ringing back tone to the terminal 10. When the called terminal 40 sends an off-hook signal to the local exchange 30 (at step S4), conversation is started and ended with an on-hook signal (at step S5).

The access network system 20 which has received the on-hook signal transfers a SIGNAL (on-hook) message M5, a DE-ALLOCATION message M6, a DE-ALLOCATION COMPLETE message M7, a DISCONNECT message M8, and a DISCONNECT COMPLETE message M9 to/from the local exchange 30 to de-allocate or release the bearer channel.

Namely, the bearer channel is allocated to the user terminal 10 having originated calls, which is held during the communication.

Accordingly, it becomes possible to grasp the availability status of the user terminal 10 by storing the allocation status of the bearer channel for every user terminal 10.

FIG. 3 shows a V5.2 protocol sequence in which an ISDN user terminal 10 connected by e.g. the V5.2 interface calls the terminal 40 through the access network system 20 and the local exchange 30.

Messages M11–M35 transferred between the access network system 20 and the local exchange 30 are prescribed by the above-mentioned ETS300 324-1/300 347-1.

The messages M19, M22–M26, and M29 are the ones of the ISDN user-network protocol (DSS-1: Digital Signaling System No.1).

The abbreviations within the parentheses of the messages M17, M18, M22–M26, and M29 respectively stand for as follows:

SABME: Set Asynchronous Balanced Mode,
UA: Unnumbered Ack,
CALL PROC: Call Proceeding,
ALERT: Alerting,
CONN: Connect,
DISC: Disconnect,
REL: Release,
RELCOM: Release Complete.

The messages M20, M21, M27, and M28 are respectively the same as the messages M3, M4, M6, and M7 shown in FIG. 2. They are the messages relating to the allocation status (allocation/de-allocation) of the bearer channel. It is to be noted that the messages M11–M19, M22–M26, and M29–M35 are added as the messages of the above-mentioned prescript, which will not be described hereinafter.

Accordingly, it becomes possible to grasp the availability status of the user terminal 10 by storing the allocation status of the bearer channel for every ISDN user terminal 10.

FIG. 4 shows a V5.2 protocol sequence in which the PSTN user terminal 10 is called by the terminal 40.

Also when the user terminal 10 is called, the BCC protocol messages instructing the allocation/de-allocation of the bearer channel are exchanged between the local exchange 30 and the access network system 20. An "ALLOCATION message M41" in FIG. 4 is the protocol message instructing the allocation of the bearer channel to the L3address to be called. An "ALLOCATION COMPLETE message M42" is the message notifying that the allocation process is normally completed.

Also, when the bearer channel is de-allocated, the same messages (not shown) as the "DE-ALLOCATION message M6" and the "DE-ALLOCATION COMPLETE message M7" shown in FIG. 2 are exchanged.

Accordingly, even at the time of signal arrival, it becomes possible to grasp the availability status of the PSTN user terminal 10 by storing the allocation status of the bearer channel for every user terminal 10.

FIG. 5 shows a V5.2 protocol sequence in which the ISDN user terminal 10 is called by the terminal 40. It is to be noted that messages M51–M56 and M59–M65 do not relate to the present invention, so that their description is hereby omitted.

Also in this sequence, an "ALLOCATION message M57" instructing the allocation of the bearer channel, an "ALLOCATION COMPLETE message M58", the "DE-ALLOCATION message" instructing the de-allocation, and the "DE-ALLOCATION COMPLETE message" (not shown) are exchanged between the local exchange 30 and the access network system 20.

Accordingly, even at the time of signal arrival, it becomes possible to grasp the availability status of the ISDN user terminal 10 by storing the allocation status of the bearer channel for every user terminal 10.

Also, in the present invention according to claim 5, the system manager may further determine the availability status based on loop open/close information of the access line.

Namely, the system manager can determine the availability status of the access line based on the allocation status of the bearer channel and the loop open/close (on/off-hook) status of the PSTN user circuit.

This will be described referring to an availability status table shown in FIG. 6 for determining the availability status of the access line based on the bearer channel allocation status and the loop open/close status of the PSTN access line by the BCC protocol.

Availability statuses "Idle", "Busy", "Lockout", and "Busy (Ringing)" are set corresponding to four groups whose BCC protocols and loop statuses are respectively ① "De-allocation" and "Open", ② "Allocation" and "Close", ③ "De-allocation" and "Close", and ④ "Allocation" and "Open".

Namely, the availability status of the access line can be classified into four statuses i.e. "Idle", "Busy", "Lockout", and "Busy (Ringing)".

Thus, it becomes possible to more precisely grasp the availability status of the user terminal 10.

Also, in the present invention according to claim 6, a test unit for testing the access line may be further provided based on the availability status.

Namely, when testing the access line, the test unit can test the access line which is not "busy" by referring to the availability status corresponding to the access line concerned.

Thus, it becomes possible to test the access line without disconnecting the line during the conversation or the data communication.

Also, in the present invention according to claim 7, the test unit may test a plurality of access lines, and select the access line which can be tested based on the availability status of each access line to autonomously test the access line.

Furthermore, in the present invention according to claim 8, the test unit may test the access line which has not yet been tested when the access line becomes possible to be tested.

Namely, the test unit which tests a plurality of access lines sequentially selects the access line to be tested, and tests the access line which is not "busy" by referring to availability status information of the selected access line. The test for the access line in the state of "busy" is awaited until the access line becomes not "busy", or is retried by referring to the availability status after all of the access lines to be tested in the state of not "busy" have been tested.

Thus, it becomes possible to efficiently test a plurality of access lines without disconnecting the line during the conversation or the data communication.

BRIEF DESCRIPTION OF THE DRAWINGS

FIG. 1 is a block diagram illustrating an arrangement of an access network system according to the present invention and a local exchange connected to a V5.2 interface system as an example;

FIG. 8 is a chart illustrating a corresponding relationship between a V 5.2 PSTN user status, an allocation status, a loop status, a status output, and the result of access line test in an embodiment of an access network system according to the present invention;

FIG. 15 is a protocol sequence diagram illustrating an example (7) of a V5.2 PSTN user terminal in an embodiment of an access network system, according to the present invention.

Throughout the figures, like reference numerals indicate like or corresponding components.

DESCRIPTION OF THE EMBODIMENTS

Figure 2:
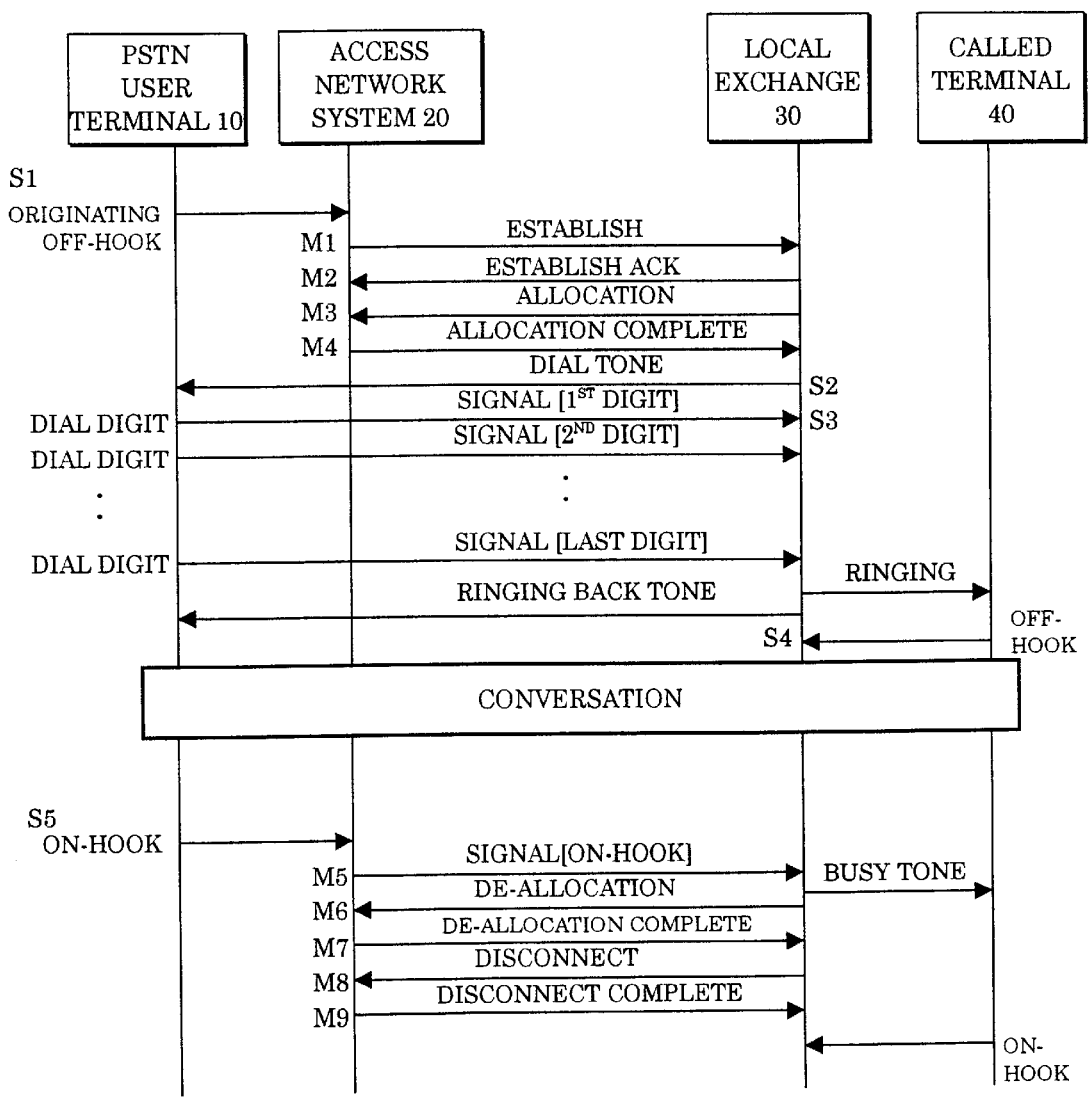
FIG. 2 is a protocol sequence diagram when e.g. a V5.2 PSTN user terminal originates calls, accommodated in an access network system according to the present invention.
Figure 3:
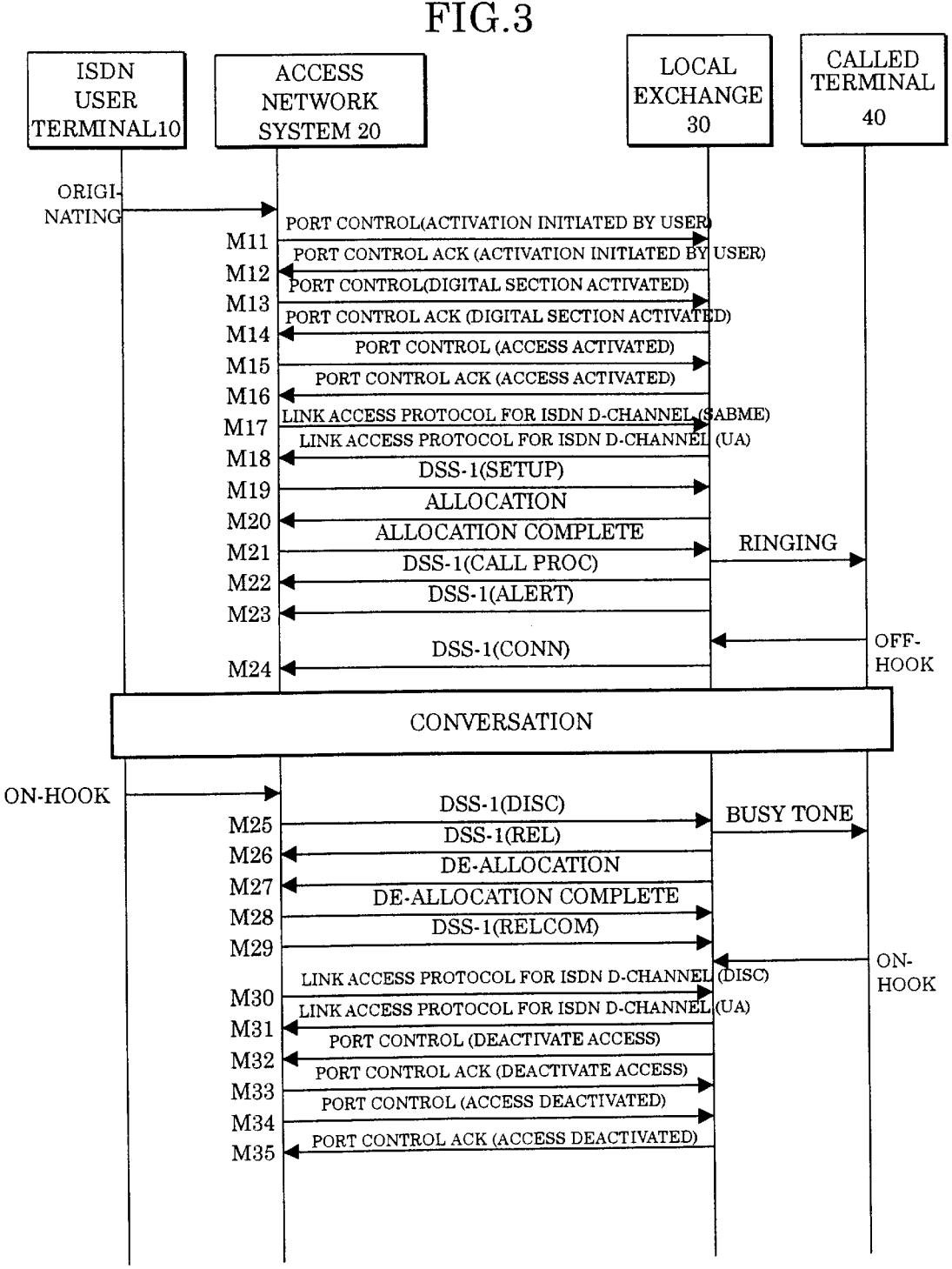
FIG. 3 is a protocol sequence diagram when e.g. a V5.2 ISDN user terminal originates calls, accommodated in an access network system according to the present invention.
Figure 4:
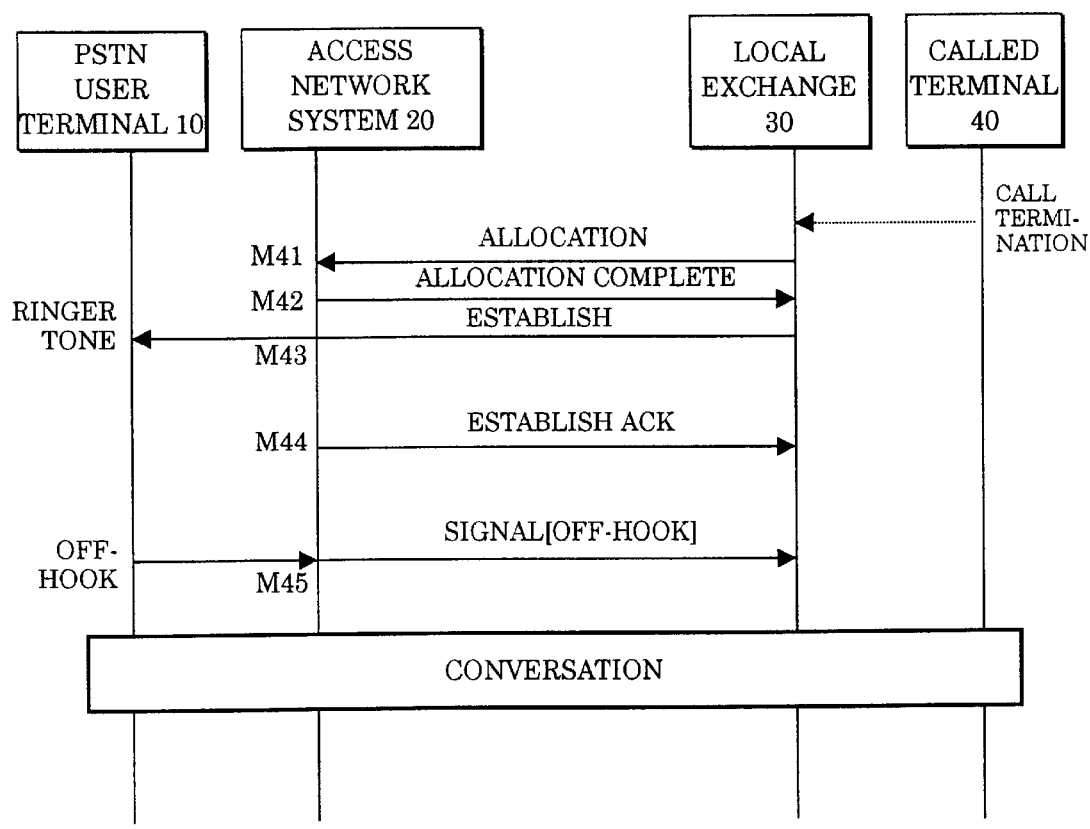
FIG. 4 is a protocol sequence diagram when e.g. a V5.2 PSTN user terminal is called, accommodated in an access network system according to the present invention.
Figure 5:
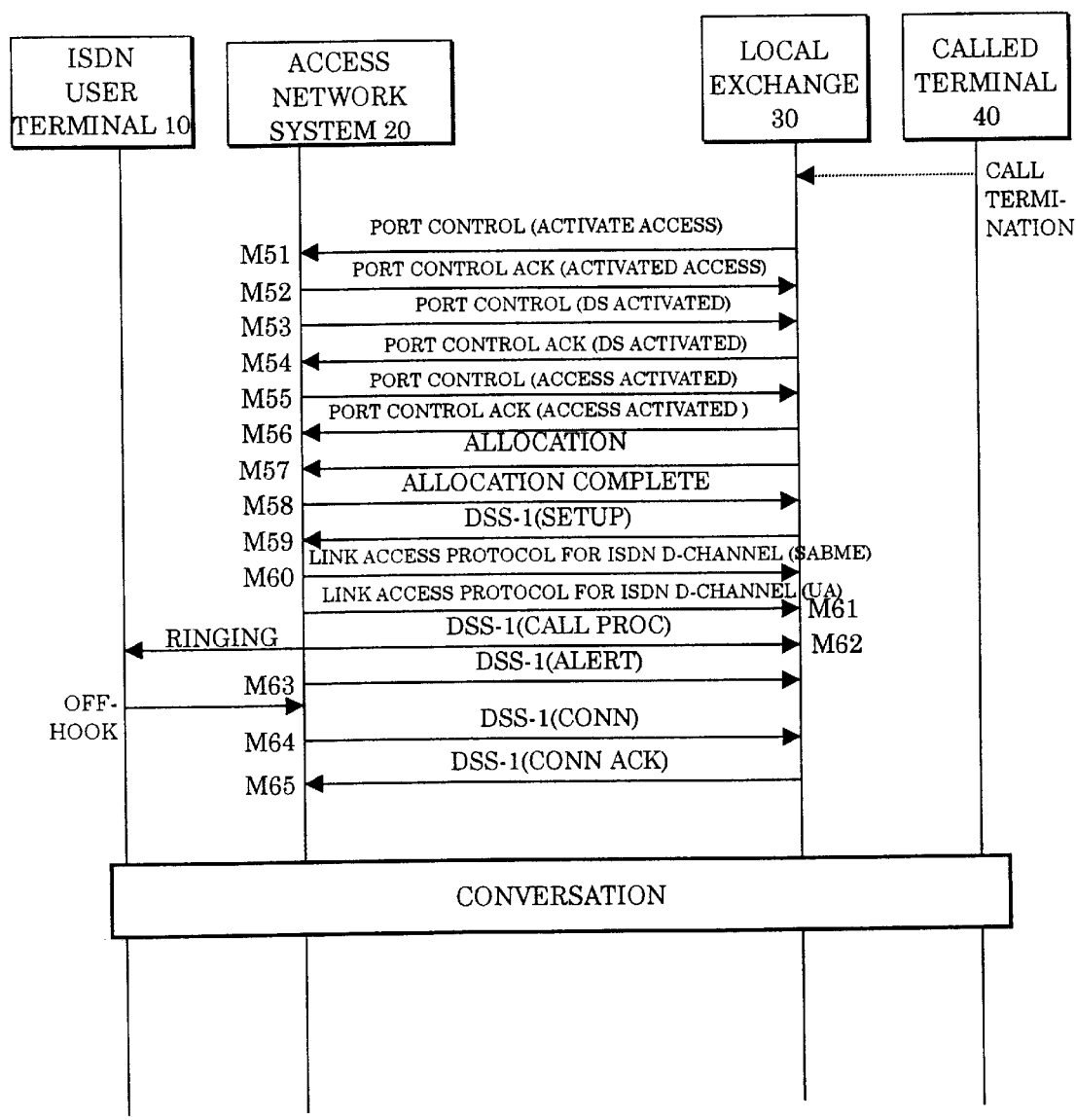
FIG. 5 is a protocol sequence diagram when e.g. a V5.2 ISDN user terminal is called, accommodated in an access network system according to the present invention.
Figures 6, 7:
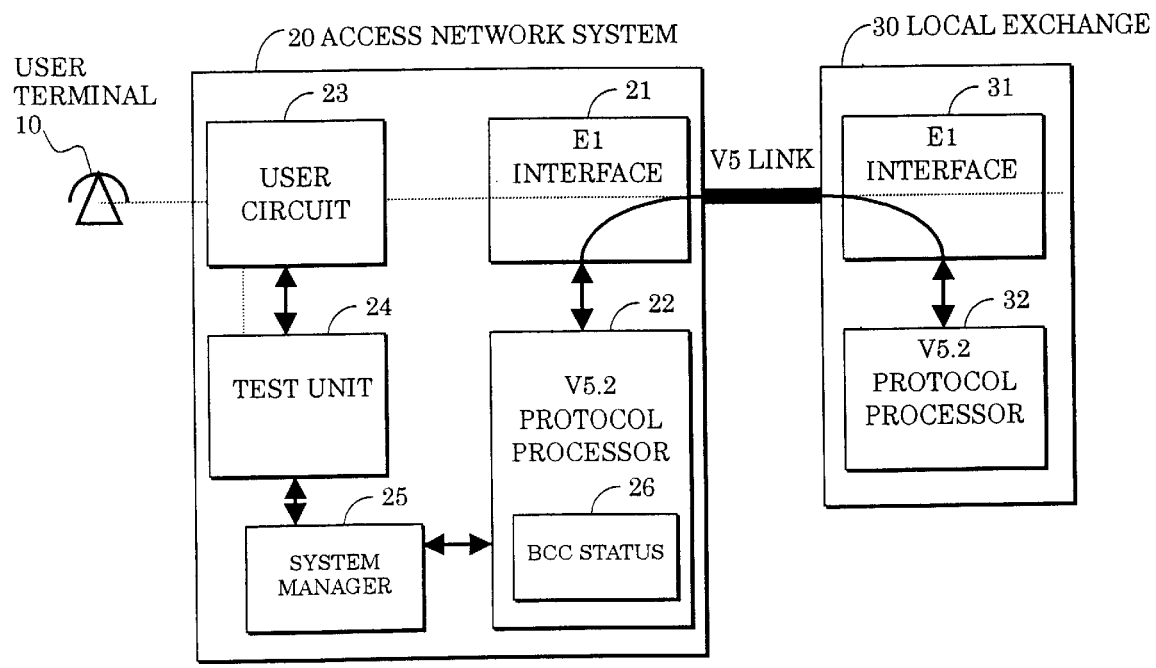
FIG. 6 is a diagram illustrating a corresponding relationship between an allocation status of a bearer channel, a loop status of a PSTN access line, and an availability status in an access network system according to the present invention.
FIG. 7 is a block diagram illustrating an embodiment of an access network system according to the present invention.

FIG. 7 shows an embodiment of the access network system 20 in PSTN/ISDN according to the present invention. The access network system 20 is composed of an E1 interface 21, a V5.2 protocol processor 22 including a BCC status memory (allocation status table) 26, a user circuit 23, a test unit 24, and a system manager 25.

The user circuit 23 accommodates a user terminal 10, and the E1 interface 21 is connected to the local exchange 30.

The local exchange 30 includes an E1 interface 31 and a V5.2 protocol processor 32 connected to the E1 interface 21 via a V5 link.

In operation, the V5 link which connects the E1 interfaces 21 and 31 is connected with the V5.2 protocol executed by the V5.2 protocol processors 22 and 32. The user terminal 10 is connected to a second user terminal (not shown) through the user circuit 23, the V5 link, and the E1 interfaces 21 and 31 for the conversation or communication. Also, the test unit 24 tests the line connected to the user terminal 10 through the user circuit 23.

The V5.2 protocol processors 22 and 32 perform the processing of the V5.2 interface protocol, that is, perform the processing which relates to the transmission/reception of the V5.2 protocol message. Also, the processors 22 and 32 normally have L3 address information of the V5.2 PSTN/ISDN user, and perform the BCC protocol processing to each L3 address. The BCC status memory 26 holds the L3 addresses and the allocation status table having stored the transmission status of the ALLOCATION COMPLETE message and the DE-ALLOCATION COMPLETE message corresponding to the L3 addresses.

In the initial state, "0 (Idle)" is written in the allocation status.

When a call transmission or a call reception occurs so that the V5.2 protocol processor 22 normally returns the ALLOCATION COMPLETE message with respect to the ALLOCATION message transmitted from the local exchange 30, "1 (Busy)" is written in the allocation status of the L3 address corresponding to the call transmission and the call reception.

When returning the DE-ALLOCATION COMPLETE message with respect to the DE-ALLOCATION message transmitted from the local exchange 30 for de-allocating or releasing the bearer channel, the V5.2 protocol processor 22 resets the allocation status corresponding to the L3 address to "0 (Idle)".

It is possible to confirm the current availability status of the line of each L3 address by referring to the allocation status.

When a maintenance person wishes to confirm the current availability status of the line for instance, he sends a command for confirming the availability status of the line to the system manager 25, which collects Idle/Busy data of the line by referring to the allocation status to notify the maintenance person of the data.

In addition, the access line is tested by the maintenance person's designation of a port of the user circuit 23 where the line to be tested is accommodated to the system manager 25. When the system manager 25 refers to the allocation status of the L3 address for the designated port and resultantly the value is "0", the system manager 25 determines that the line is not busy and notifies the test unit 24 of the test start. When the value is "1", the system manager 25 does not notify the test start.

The test unit 24 which has received the notification of the test start begins to test the access line connected to the user terminal 10. When the value of the allocation status changes to "1" during the test, the test unit 24 determines that the line is busy and stops the test.

In automatically testing the access line, the system manager 25 refers to the allocation status of the L3 address to be tested by controlling the test unit 24 and continues the test when the value is "0". When the value is "1", the system manager 25 skips the test for the busy access line to that for the next access line, awaits the test for the busy access line until it becomes testable, or retries the test for the skipped access line after the other access lines not skipped in the state of not "busy" have been tested.

While the above-mentioned example, the availability status of the access line is determined only by the allocation status, in the PSTN user terminal, the determination can be further made with loop status information indicating the open/close loop collected from the PSTN user circuit 23 in combination with the allocation status information, whereby the more precise availability status of the PSTN access line can be recognized.

FIG. 8 shows a corresponding relationship between "Subscriber (user) Status", "Allocation Status", "Loop Status", "Status Output", and "The Result of Subscriber (access) Line Test" in the allocation status table 26 of the PSTN access line (L3 address) which the V5.2 protocol processor 22 in FIG. 7 holds.

The subscriber status is classified into the following 16 statuses; (1) On-hook, (2) Dialing/Calling, (3) Conversation, (4) Called subscriber on-hook and within time out, (5) Called subscriber on-hook and time out, (6) Encountering called subscriber busy state (within time out), (7) Remote calling subscriber on-hook in conversation and within time out, (8) Remote calling subscriber on-hook in conversation and time out, (9) Error dialed number and within time out, (10) Error dialed number and time out, (11) No dial and within time out, (12) No dial and time out, (13) No answer and time out, (14) Shorting wire and within time out, (15) Shorting wire and time out, and (16) Ringing.

"Allocation status" is composed of "Allocated" and "De-Allocated". "Loop Status" is composed of "Open" and "Close". "Status Output" is composed of "Idle", "Busy", and "Lockout". "The Result of subscriber line test" is composed of "On-hook (Line condition is normal)", "Refuse", "Off-hook, and "Shorting wire".

The maintenance person can grasp the current status of the access line referring to e.g. a lamp indicating the status output or the result of test for each access line. For example, when an "Idle" lamp (or an "On-hook" lamp of the result of test) is turned on, the access line is tested. When other "Busy" or "Lockout" lamp (or "Refuse", "Off-hook" or "Shorting wire" lamp of the result of test) is turned on, the access line is not tested.

In addition, the system manager 25 can control the test unit 24 by referring to the "Status Output" and perform the automatic test to a plurality of access lines.

FIGS. 9–15 show protocol sequences at the time of the call transmission and the call reception between the access network system which accommodates the V5.2 PSTN user terminal 10 and the local exchange 30 connected to the called terminal 40.

Sequence sections (1)–(16) shown in FIGS. 9–15 correspond to the subscriber statuses (1)–(16) shown in FIG. 8. It is to be noted that the sequence sections (1)–(16) occasionally indicate the sequence sections brought to the subscriber statuses (1)–(16) shown in FIG. 8.

Hereinafter, the subscriber status, the allocation status, and the loop status as well as the status output at the moment in each of the sequences will be described referring to FIGS. 9–15.

Figure 9:
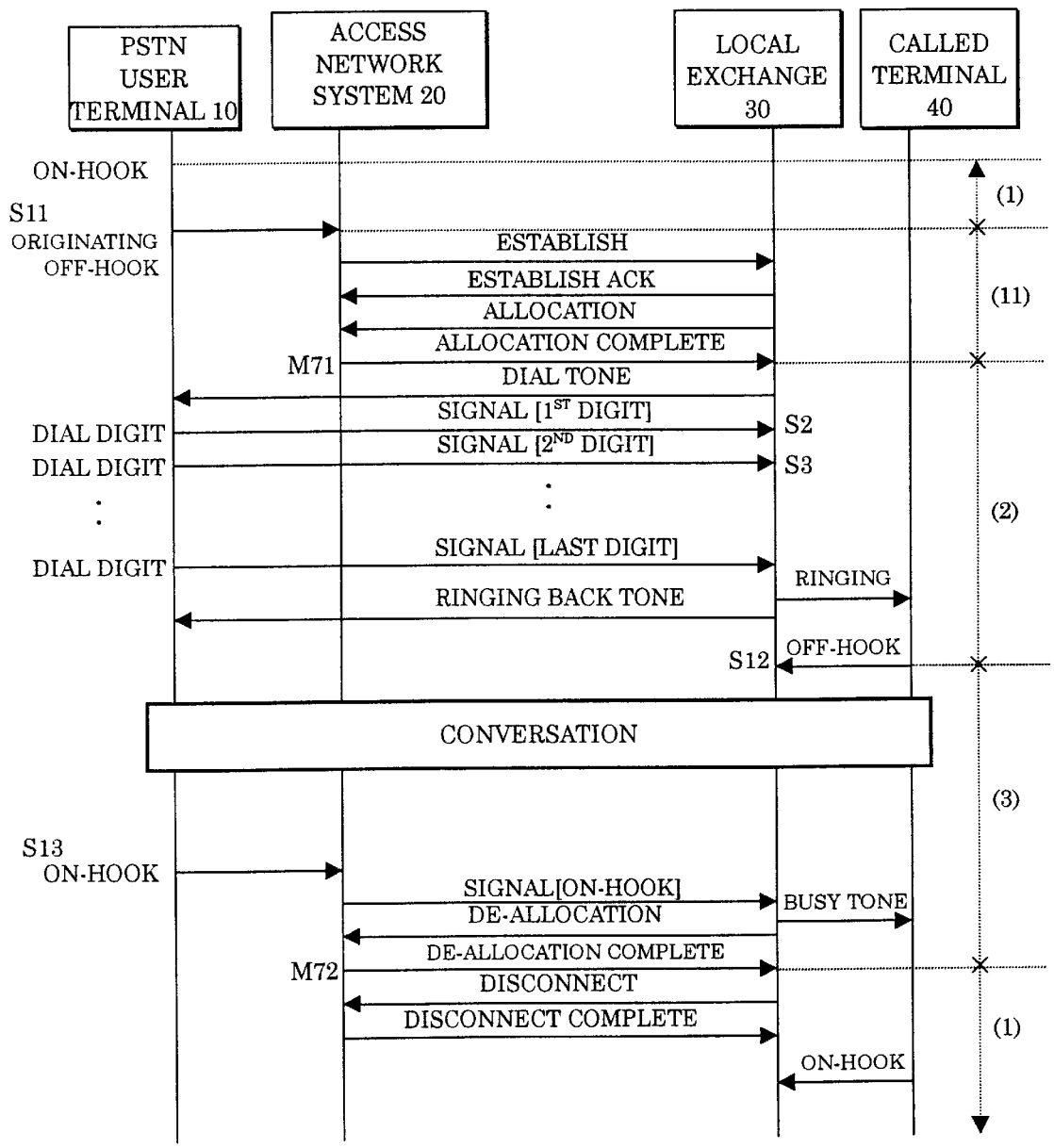
FIG. 9 is a protocol sequence diagram illustrating an example (1) of a V5.2 PSTN user terminal in an embodiment of an access network system according to the present invention.

In FIG. 9, the sequence section (1) is "On-Hook" section, in which the allocation status and the loop status are respectively "De-allocated" and "Open". The status output of the access line is "Idle" which enables the test so that the result of test is "On-Hook".

In the sequence section (1), the access line can be tested as mentioned above. Thus, it is easily determined whether or not the test for the access line can be performed referring to the status output and the result of test corresponding to the sequence sections (1)–(16) shown in FIG. 8.

The sequence section (11) is "No dial and within time out" section, in which the loop status and the allocation status are respectively set to "Close" and "Allocated" by the call transmission, i.e. off-hook (at step S11) and an ALLOCATION COMPLETE message M71. The status output of the access line at this moment is "Busy" which disables the test, so that the result of test is "Refuse".

The sequence section (2) is "Dialing/Calling" section, in which the allocation status and the loop status are respectively "Allocated" and "Close". The status output of the access line is "Busy (Calling)" which disables the test, so that the result of test is "Refuse".

The sequence section from the Off-Hook made by the called terminal 40 (at step S12) to a DE-ALLOCATION COMPLETE message M72 is the section (3), i.e. "Conversation", in which the allocation status and the loop status are respectively "Allocated" and "Close". The current status output of the access line is "Busy" which disables the test, so that the result of test is "Refuse".

In the section after the DE-ALLOCATION COMPLETE message M72, the allocation status is "De-allocated". Also, since the on-hook operation has already occurred in the user terminal 10 at step S13, the loop status is "Open". Accordingly, the sequence section after the DE-ALLOCATION COMPLETE message M72 is same as the section (1).

Figure 10:
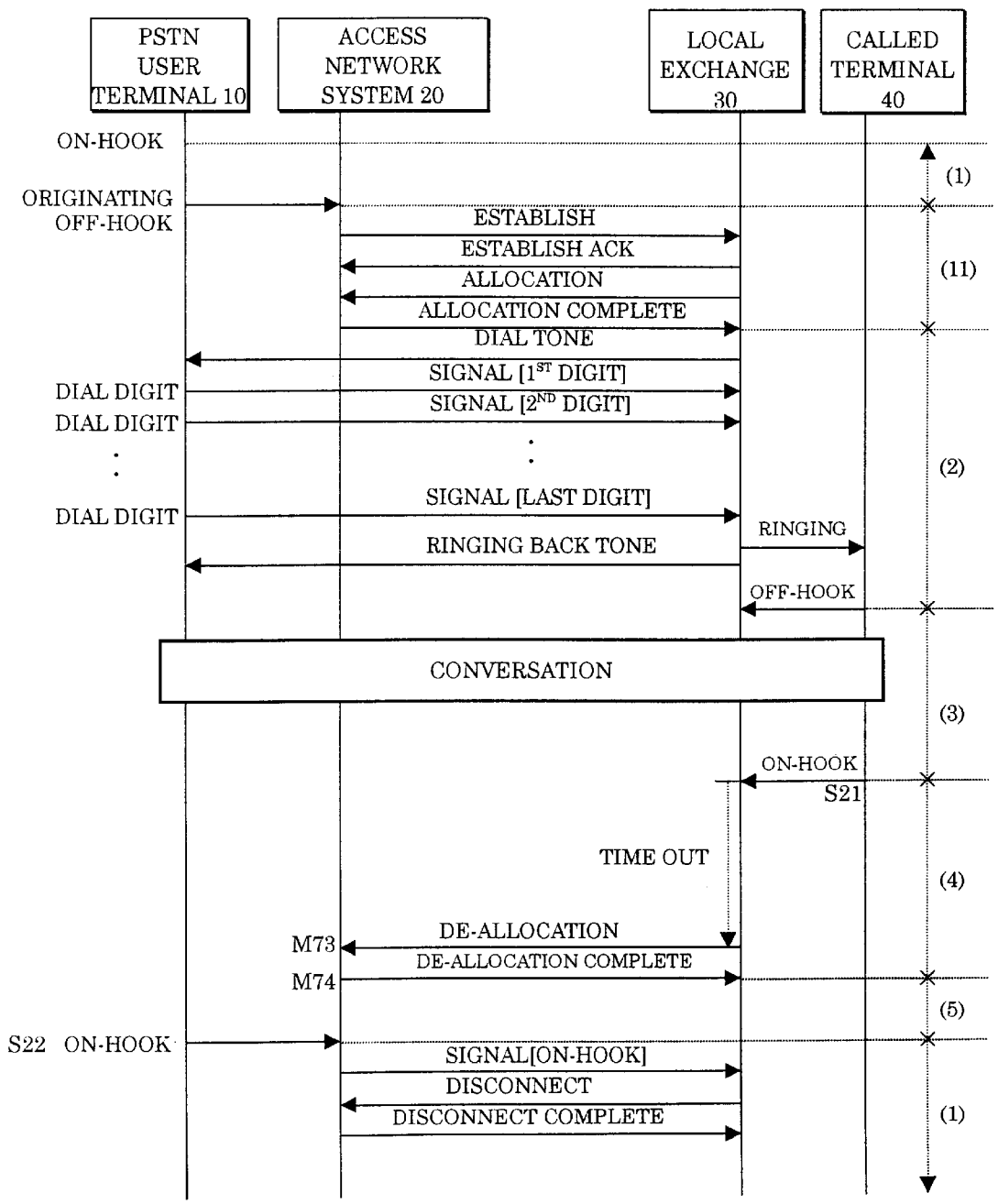
FIG. 10 is a protocol sequence diagram illustrating an example (2) of a V5.2 PSTN user terminal in an embodiment of an access network system according to the present invention.

In FIG. 10, the sections (1), (11), and (2) are the same as those in FIG. 9. Different from the example in FIG. 9, after the called terminal 40 (at step S21) has made the On-Hook operation in the section (3), in the section (4) no on-hook operation is made in the terminal 10 even after a fixed time has passed, so that DE-ALLOCATION/DE-ALLOCATION COMPLETE messages M73 and M74 are transmitted/received. This section (4) is "Called subscriber on-hook and within time out" section.

The allocation status and the loop status in this section remain respectively "Allocated" and "Close", so that the status output and the result of test are "Busy" and "Refuse".

In addition, the section (5) from the DE-ALLOCATION COMPLETE message M74 to the On-Hook made by the terminal 10 (at step S22) is "Called subscriber on-hook and time out" section. The allocation status at this time is "De-allocated", and the loop status still remains "Close". The status output and the result of test are respectively "Lockout" and "Off-hook".

The section after step S22 is the same as the section (1).

Figure 11:
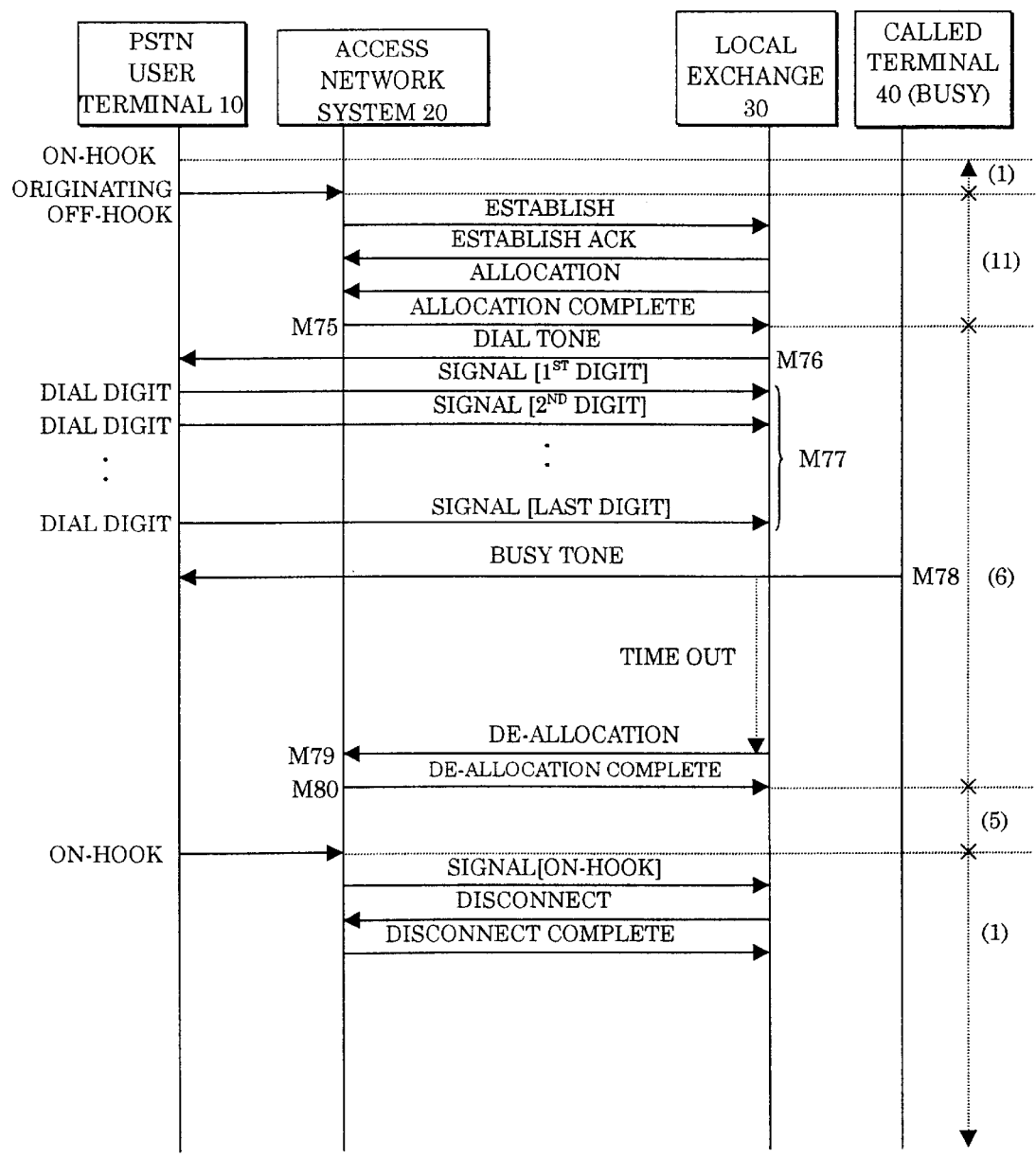
FIG. 11 is a protocol sequence diagram illustrating an example (3) of a V5.2 PSTN user terminal in an embodiment of an access network system according to the present invention.

In FIG. 11, the sections (1) and (11) are the same as those in FIG. 9.

The section from the transmission of an ALLOCATION COMPLETE message M75 by the user terminal 10 at the end of the section (11) to the de-allocation of the connection with DE-ALLOCATION/DE-ALLOCATION COMPLETE messages M79 and M80 during which Dialing M77 is performed with Dial Tone M76, and no on-hook operation is made in spite of the reception of a Busy Tone M78 so that time out occurs after a fixed time has passed is the section (6), i.e. "Encountering called subscriber busy state (within time out)".

In the section (6), the allocation status and the loop status are respectively "Allocated" and "Close". The status output and the result of test are respectively "Busy" and "Refuse".

The sections (5) and (1) after the DE-ALLOCATION COMPLETE message M80 are the same as the example in FIG. 10.

Figure 12:
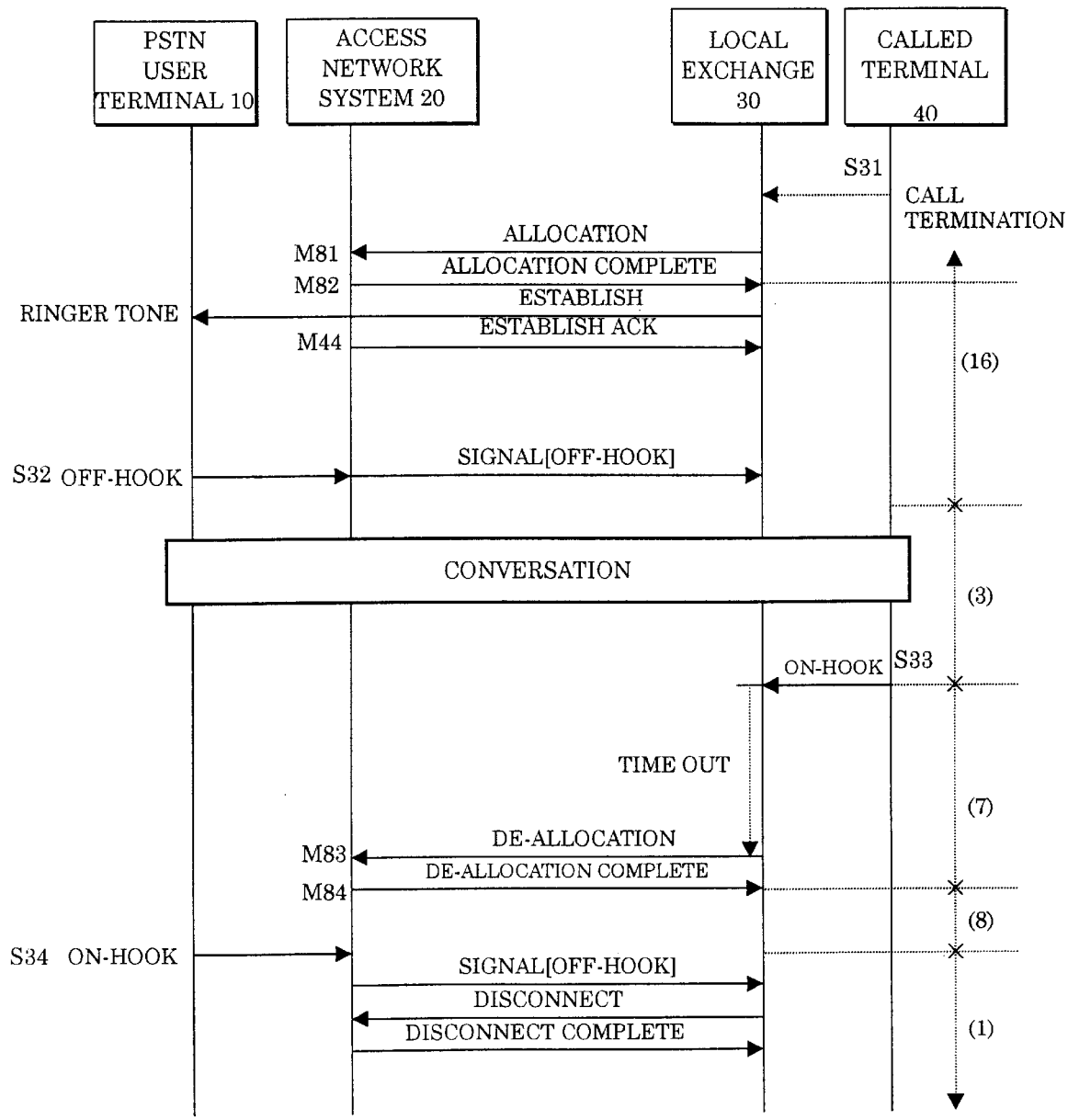
FIG. 12 is a protocol sequence diagram illustrating an example (4) of a V5.2 PSTN user terminal in an embodiment of an access network system according to the present invention.

FIG. 12 shows a protocol sequence when the terminal 40 transmits calls.

The section from the transmission/reception of ALLOCATION/ALLOCATION COMPLETE messages M81 and M82 at the access network system 20 and the local exchange 30 after the call transmission of the terminal 40 (at step S31) to the Off-Hook made by the terminal 10 (at step S32) is "Ringing" section (16). At this time, the allocation status and the loop status are respectively "Allocated" and "Open", and the status output and the result of test are respectively "Busy" and "Refuse".

The section (3) after the section (16) is the same as the example in FIG. 9.

At the end of the section (3), the called terminal 40 finishes the conversation with the On-Hook operation (at step S33). When no on-hook operation is made in the terminal 10 even after a fixed time has passed since the on-hook operation is made in the called terminal 40, a DE-ALLOCATION message M83 and a DE-ALLOCATION COMPLETE message M84 are compulsorily transferred. This section is the section (7), i.e. "Remote calling subscriber on-hook in conversation and within time out".

At this time, the allocation status and the loop status are respectively "Allocated" and "Close", and the status output and the result of test are respectively "Busy" and "Refuse".

The section after the transmission of the DE-ALLOCATION COMPLETE message M84 until the On-Hook made by the terminal 10 (at step S34) is the section (8), i.e. "Remote calling subscriber on-hook in conversation and time out". At this time, the allocation status and the loop status are respectively "De-allocated" and "Close", and the status output and the result of test are respectively "Lockout" and "Off-hook". The following section is the same as the section (1) as mentioned above.

Figure 13:
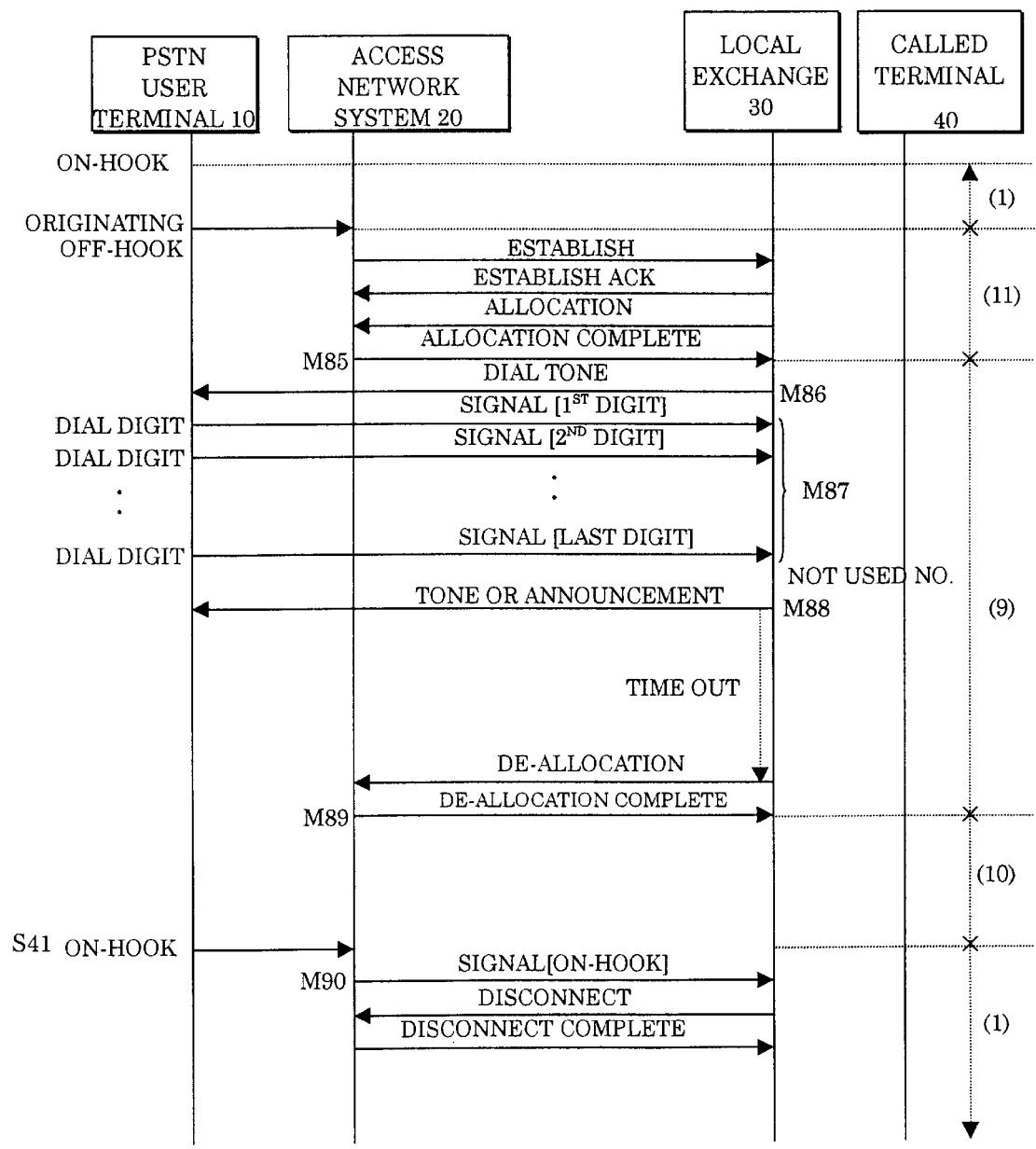
FIG. 13 is a protocol sequence diagram illustrating an example (5) of a V5.2 PSTN user terminal in an embodiment of an access network system according to the present invention.

In FIG. 13, the sections (1) and (11) are the same as the example in FIG. 9.

The section from the transmission of an ALLOCATION COMPLETE message M85 by the user terminal 10 at the end of the section (11) to that of a DE-ALLOCATION COMPLETE message M89 during which Dialing M87 is performed with a dial number not used in a Dial Tone M86, no on-hook operation is made in spite of the reception of a Tone or the Announcement M88 so that the time out occurs after a fixed time has passed is the section (9), i.e. "Error dialed number and within time out". At this time, the allocation status and the loop status respectively remain "Allocated" and "Close". The status output and the result of test are respectively "Busy" and "Refuse".

The section after the transmission of the DE-ALLOCATION COMPLETE message M89 at the end of the section (9) until the transmission of an On-Hook SIGNAL M90 with the On-Hook (at step S41) made by the terminal 10 is the section (10), i.e. "Error dialed number and time out". At this time, the allocation status is "De-allocated" and the loop status remains "Close". The status output and the result of test are respectively "Lockout" and "Off-hook".

The section after the On-Hook SIGNAL M90 is the same as the section (1).

Figure 14:
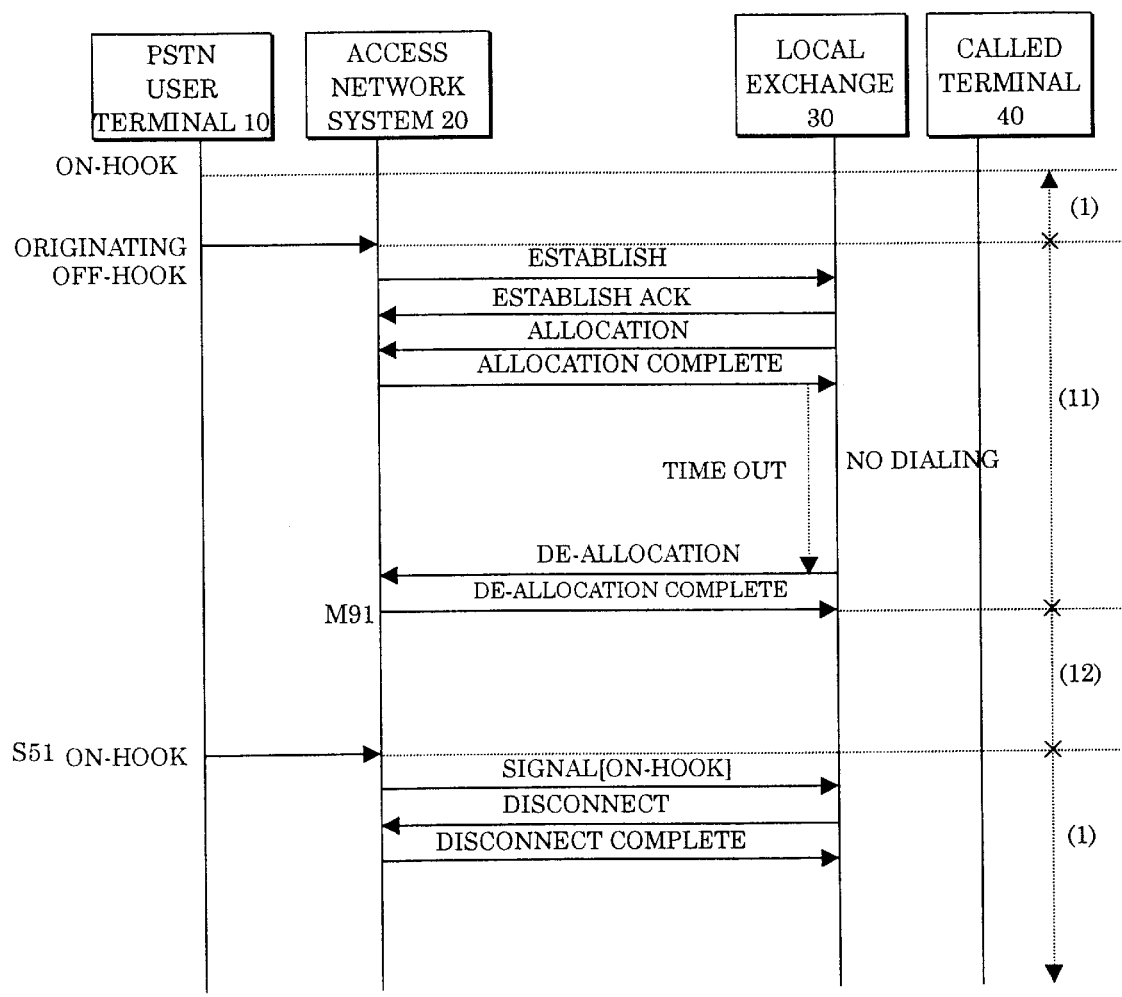
FIG. 14 is a protocol sequence diagram illustrating an example (6) of a V5.2 PSTN user terminal in an embodiment of an access network system according to the present invention.

In FIG. 14, the section (1) is the same as the example in FIG. 9. In the section (11) following the section (1), the user terminal 10 does not perform the Dialing M87 (see FIG. 13), the time out occurs after a fixed time has passed, and a DE-ALLOCATION COMPLETE message M91 is transmitted. The On-Hook (at step S51) occurs at the user terminal 10 in the section (12).

The section (12) is a section of "No dial and time out", in which the allocation status and the loop status are respectively "De-allocated" and "Close", and the status output and the result of test are respectively "Lockout" and "Off-hook".

The section (1) after step S51 is the same as the section (1) in FIG. 13.

FIG. 15 shows a protocol sequence when the line is short-circuited (shorting wire) in the section (1) in spite of the no on-hook operation in the user terminal 10.

At this time, the access network system 20 regards the shorting wire (at step S61) as the off-hook, and exchanges ESTABLISH/ESTABLISH ACK/ALLOCATION/ALLOCATION COMPLETE messages M92–M95 with the local exchange 30.

However, in the absence of dialing performed, the local exchange 30 automatically exchanges DE-ALLOCATION/DE-ALLOCATION COMPLETE messages M96 and M97 after a fixed time to de-allocate the bearer connection.

This section and the following section are the section (14), i.e. "Shorting wire and within time out" and the section (15), i.e. "Shorting wire and time out". The allocation statuses, the loop statuses, the status outputs and the results of test at that time are respectively "Allocated", "Close", "Busy" and "Refuse" as well as "De-allocated", "Close", "Lockout" and "Shorting wire".

As described above, an access network system according to the present invention is arranged such that a processor stores an allocation status of a bearer channel to be managed, and a system manager determines an availability status of an access line based on the allocation status. Therefore, it becomes possible to grasp the availability status of a PSTN and ISDN user line to be tested.

Also, it becomes possible for the processor to more precisely grasp the availability status of the PSTN user line and to detect a short-circuit by determining the availability status based on the allocation status and loop open/close information of the PSTN user line.

Furthermore, it becomes possible for the system manager to test user lines without influencing users during communication by activating a test unit based on the availability status.

What we claim is:

1. An access network system comprising;
   a processor which performs a connection and a release process of a bearer channel and storing, per access line, an allocation status of the bearer channel to be managed;

a system manager which determines an availability status of an access line based on the allocation status; and a test unit which tests the access line when the availability status shows that the access line is not busy.

2. The access network system as claimed in claim 1 wherein the processor determines the allocation status based on an ALLOCATION COMPLETE message and a DE-ALLOCATION COMPLETE message for the bearer channel.

3. The access network system as claimed in claim 2 wherein the access line forms a PSTN.

4. The access network system as claimed in claim 2 wherein the access line forms an ISDN Basic Rate Access.

5. The access network system as claimed in claim 3 wherein the system manager determines the availability status based on a combination of the allocation status and loop open/close information of the access line.

6. The access network system as claimed in claim 1 wherein the processor comprises a Bearer Channel Connection protocol processor which performs the connection and the release process of the bearer channel by the V5.2 protocol.

7. The access network system as claimed in claim 1 wherein the test unit tests a plurality of access lines, and selects the access line which can be tested based on the availability status of each access line to autonomously test the access line.

8. The access network system as claimed in claim 7 wherein the test unit tests the access line which has not yet been tested when the access line becomes possible to be tested.

* * * * *